(12) United States Patent
Zhang et al.

(10) Patent No.: US 12,316,056 B2
(45) Date of Patent: May 27, 2025

(54) CHARGING ADAPTER DEVICE AND INSTALLING METHOD THEREOF

(71) Applicant: Dongguan Leader Precision Industry Co., Ltd., Dongguan (CN)

(72) Inventors: Xiaoqing Zhang, Dongguan (CN); Lijun Xu, Dongguan (CN)

(73) Assignee: DONGGUAN LEADER PRECISION INDUSTRY CO., LTD., Dongguan (CN)

( * ) Notice: Subject to any disclaimer, the term of this patent is extended or adjusted under 35 U.S.C. 154(b) by 0 days.

(21) Appl. No.: 18/367,216

(22) Filed: Sep. 12, 2023

(65) Prior Publication Data
US 2023/0420899 A1    Dec. 28, 2023

Related U.S. Application Data

(63) Continuation of application No. 17/400,649, filed on Aug. 12, 2021, now Pat. No. 11,799,254.

(30) Foreign Application Priority Data

Dec. 15, 2020 (CN) .......................... 202011480673.3
Dec. 15, 2020 (CN) .......................... 202023020526.6

(51) Int. Cl.
*H01R 31/06* (2006.01)
*H01R 13/504* (2006.01)
(Continued)

(52) U.S. Cl.
CPC .......... *H01R 31/06* (2013.01); *H01R 13/504* (2013.01); *H01R 13/5219* (2013.01); *H01R 43/24* (2013.01); *H02J 7/0045* (2013.01)

(58) Field of Classification Search
CPC .. H01R 31/06; H01R 13/504; H01R 13/5219; H01R 43/24; H02J 7/0045
See application file for complete search history.

(56) References Cited

U.S. PATENT DOCUMENTS

| 3,958,849 A | 5/1976 | Blairsdale |
| 4,010,993 A | 3/1977 | Hohenberger et al. |
| (Continued) | | |

FOREIGN PATENT DOCUMENTS

| CN | 105591243 A | 5/2016 |
| CN | 106207556 A | 12/2016 |
| (Continued) | | |

OTHER PUBLICATIONS

Chinese Office Action and Search Report for Chinese Application No. 202011480673.3, dated Dec. 25, 2024, with English translation.

*Primary Examiner* — Thanh Tam T Le
(74) *Attorney, Agent, or Firm* — Birch, Stewart, Kolasch & Birch, LLP

(57) ABSTRACT

Provided are a charging adapter device and an installing method of a charging adapter device. The charging adapter device includes a connector, and the connector includes a housing and a plurality of terminals. The charging adapter device further includes an adapter plate and a plurality of pins. The adapter plate is arranged in the housing and electrically connected to the terminals. The pins are electrically connected to the adapter plate such that the pins are electrically conductive with the connector through the adapter plate.

16 Claims, 4 Drawing Sheets

(51) Int. Cl.
*H01R 13/52* (2006.01)
*H01R 43/24* (2006.01)
*H02J 7/00* (2006.01)

(56) References Cited

U.S. PATENT DOCUMENTS

| | | | |
|---|---|---|---|
| 4,525,018 A | 8/1985 | Holce et al. | |
| 4,558,916 A | 12/1985 | Hehl | |
| 6,171,129 B1 | 1/2001 | Phillips | |
| 6,338,655 B1 | 1/2002 | Masse et al. | |
| 6,530,787 B2 | 3/2003 | Harting et al. | |
| 6,705,875 B2 | 3/2004 | Berghorn et al. | |
| 6,772,897 B2 | 4/2004 | Wu | |
| 7,722,362 B2 | 5/2010 | Frake et al. | |
| 7,892,023 B2* | 2/2011 | Chang | A61P 25/00 439/577 |
| 7,922,538 B2* | 4/2011 | Chang | A61P 25/00 439/577 |
| 7,942,702 B2 | 5/2011 | Chang | |
| 8,162,691 B2 | 4/2012 | Chang | |
| 8,286,879 B2* | 10/2012 | Chang | G06K 19/07743 235/441 |
| 8,348,685 B2 | 1/2013 | Liao et al. | |
| 8,460,030 B2* | 6/2013 | Chang | H01R 13/6658 439/541.5 |
| 9,124,069 B2 | 9/2015 | Dong et al. | |
| 9,276,340 B2 | 3/2016 | Amini et al. | |
| 9,742,133 B1 | 8/2017 | Chen | |
| 10,069,265 B2 | 9/2018 | Wu | |
| 2010/0151743 A1 | 6/2010 | Zhou et al. | |
| 2011/0143564 A1 | 6/2011 | Lee et al. | |

FOREIGN PATENT DOCUMENTS

| | | |
|---|---|---|
| CN | 108336596 A | 7/2018 |
| CN | 207611897 U | 7/2018 |
| CN | 209029609 U | 6/2019 |
| CN | 211017666 U | 7/2020 |
| CN | 111969381 A | 11/2020 |
| CN | 213602135 U | 7/2021 |
| JP | 3174829 U | 4/2012 |
| TW | 201622268 A | 6/2016 |
| WO | WO 2013/184906 A1 | 12/2013 |

* cited by examiner

CHARGING ADAPTER DEVICE AND INSTALLING METHOD THEREOF

CROSS-REFERENCE TO RELATED APPLICATION(S)

This application is a Continuation of application Ser. No. 17/400,649, filed Aug. 12, 2021, which claims priority to Chinese Patent Application No. 202011480673.3 filed Dec. 15, 2020 and Chinese Patent Application No. 202023020526.6 filed Dec. 15, 2020, the disclosure of which are incorporated herein by reference in their entireties.

TECHNICAL FIELD

The present disclosure relates to the technical field of charging devices, in particular, a charging adapter device and an installing method thereof.

BACKGROUND

With the development of science and technology, more and more kinds of electronic products appear in people's life and bring great convenience to people's life. For electronic products having batteries, an internal battery module of the electronic product typically has a two-pin input end, and the two-pin input end can be used to connect an external power supply so as to receive power to charge a battery. However, an output end of the external power supply has many kinds of specifications. Therefore, the electronic product needs to be provided with a charging adapter module with a specific specification corresponding to an output end of an external power supply with a specific specification, such that the output end of the external power supply is electrically connected to the internal two-pin input end through the charging adapter module. Due to the charging adapter module with the specific specification, the internal structures of the electronic product may need to be specially designed for adaptability, which leads to a relatively great change in the structure of the electronic product.

SUMMARY

A purpose of the present disclosure is to provide a charging adapter device capable of improving the convenience of charging a product and enabling the change of the internal structure of the product to be small.

Another purpose of the present disclosure is to provide an installing method for a charging adapter device, and the method can improve the installation efficiency of the charging adapter device.

To achieve the purpose, the present disclosure adopts solutions described below.

Provided is a charging adapter device, including a connector. The connector includes a housing and terminals. The charging adapter device further includes an adapter plate and pins. The adapter plate is arranged in the housing and electrically connected to the terminals. The pins are electrically connected to the adapter plate such that the pins are electrically conductive with the connector through the adapter plate. The number of the pins differs from the number of the terminals.

An installing method of a charging adapter device, the method is applied to the above-mentioned charging adapter device, and the method includes steps described below.

The pins and the terminals are connected to the adapter plate to form an adapter assembly.

The adapter assembly is installed in the housing and sealingly connected to the housing.

REFERENCE LIST

Figure 1:
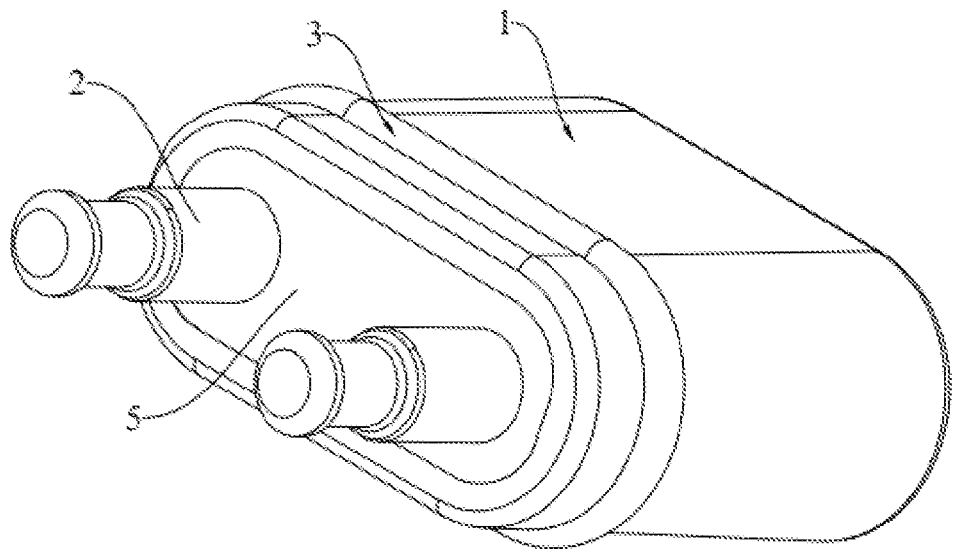
FIG. 1 is a perspective view of a charging adapter device from a first perspective according to an embodiment of the present disclosure.

1 connector
11 housing
12 terminal
13 body
14 tongue plate
15 spacer member
16 positioning piece
2 pin
3 sealing structure
31 sealing ring
4 adapter plate
41 positioning opening
5 glue
61 first accommodation space
62 second accommodation space
7 groove

DETAILED DESCRIPTION

In the description of the present disclosure, it is to be noted that the orientational or positional relationships indicated by terms "center", "above", "below", "left", "right", "vertical", "horizontal", "inside", "outside" and the like are based on the orientational or positional relationships illustrated in the drawings, which are for the mere purpose of facilitating and simplifying the description of the present disclosure, and these relationships do not indicate or imply that the device or component referred to has a specific orientation and is constructed and operated in a specific orientation, and thus it is not to be construed as limiting the present disclosure. Moreover, terms like "first" and "second" are merely for the description and are not to be construed as indicating or implying relative importance. The terms "first position" and "second position" are two different positions.

Unless otherwise expressly specified and limited, the term "installed", "connected to each other", "connected" or "fixed" is to be construed in a broad sense, for example, as fixedly connected, detachably connected, mechanically connected or electrically connected, directly connected to each other or indirectly connected to each other via an intermediary, or internally connected or interactional between two components. For those of ordinary skill in the art, the above-mentioned terms can be construed according to specific circumstances in the present disclosure.

Unless otherwise expressly specified and limited, when a first feature is described as "above" or "below" a second feature, the first feature and the second feature may be in direct contact or be in contact via another feature between the two features. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below" or "underneath" the second feature, the first feature is right under, below or underneath the second feature or the first feature is obliquely under, below or underneath the second feature, or the first feature is simply at a lower level than the second feature.

The solutions of the present disclosure will be further described below through specific embodiments in conjunction with the drawings.

Figure 2:
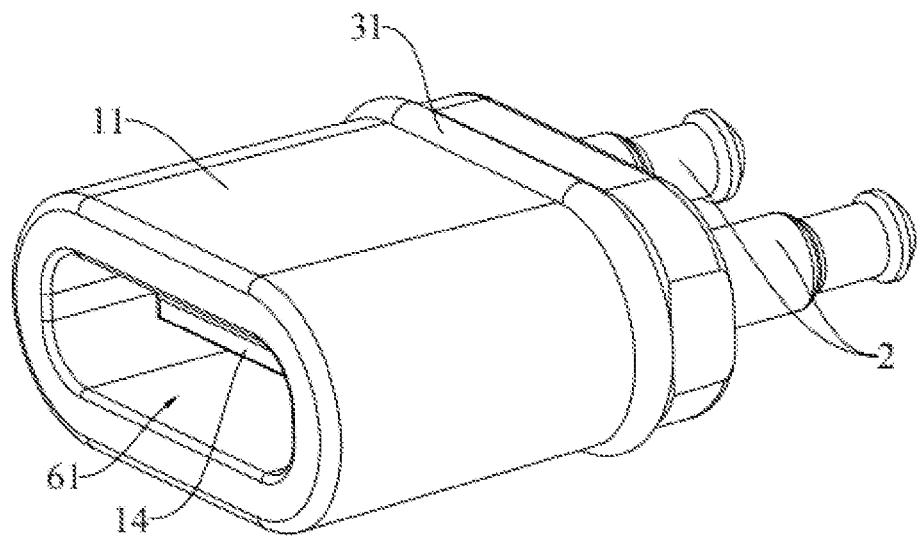
FIG. 2 is a perspective view of a charging adapter device from a second perspective according to an embodiment of the present disclosure.
Figure 3:
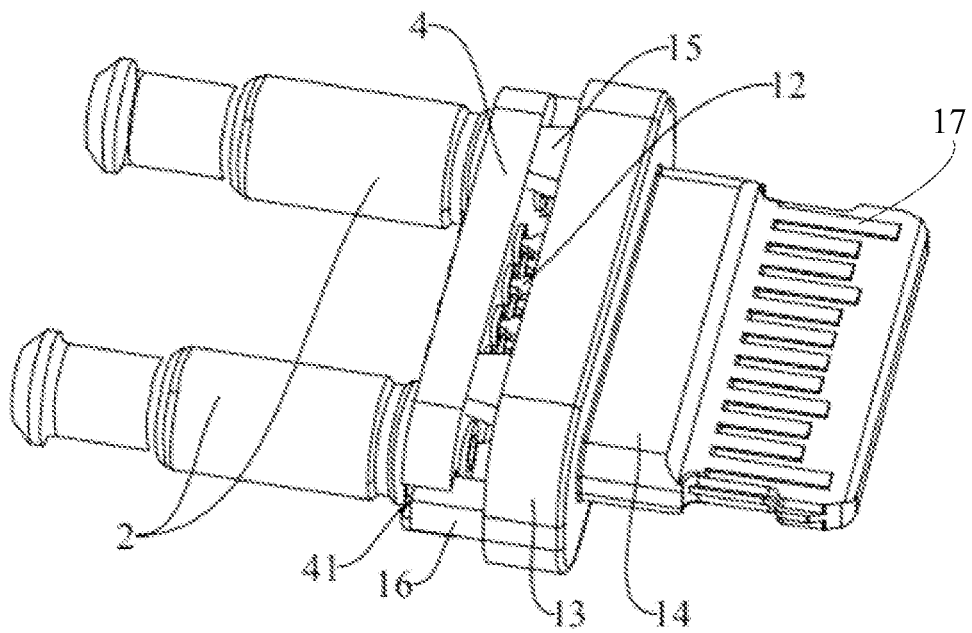
FIG. 3 is a perspective view of a charging adapter device with a housing being removed according to an embodiment of the present disclosure.
Figure 4:
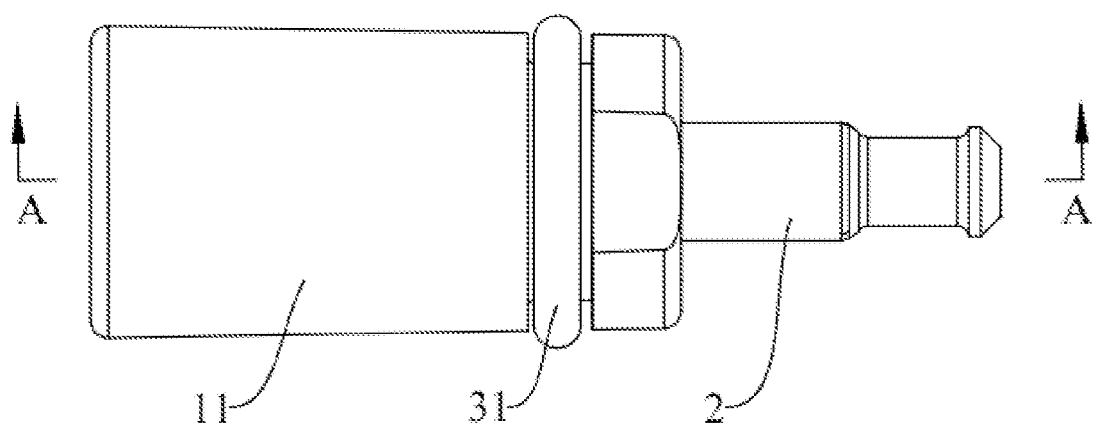
FIG. 4 is a side view of a charging adapter device according to an embodiment of the present disclosure.

This embodiment provides a charging adapter device, as shown in FIG. 1 to FIG. 3, the charging adapter device 1 includes a connector 1, an adapter plate 4 and two pins 2. The connector 1 includes a housing 11 and a terminal 12, and the adapter plate 4 is arranged in the housing 11 and electrically connected to the terminal 12. The two pins 2 are separately electrically connected to the adapter plate 4 so as to be electrically conductive with the connector 1 through the adapter plate 4. In the present application, the number of pins 2 is given as an example, and the number of pins 2 can be adjusted as needed, for example, 4 pins or more.

In this embodiment, the connector 1 is connected to the two pins 2 through the adapter plate 4. When the two pins 2 are connected to a product, the product can be charged through the connector 1, so that the connector can be used in common with chargers of other electronic products to achieve the convenience of product charging. Moreover, the charging adapter device in this embodiment is adopted, so that the product has a relatively small change in structure, the charging adapter device has a small volume, and it is convenient to carry the charging adapter device.

For example, for electronic products having batteries, an internal battery module of the electronic product typically has a two-pin input end, and the two-pin input end can be used to be connected with an external power supply so as to receive power to charge a battery. However, an output end of the external power supply has many kinds of specifications. Therefore, the electronic product needs to be provided with a charging adapter module with a specific specification corresponding to an output end of an external power supply with a specific specification, so that the output end of the external power supply is electrically connected to the internal two-pin input end through the charging adapter module. Due to the charging adapter module with the specific specification, the internal structure of the electronic product may need to be specially designed for adaptability, which leads to a relatively great change in the structure of electronic product. In this embodiment, the versatility of the charging adapter device can be improved. In some embodiments, the connector 1 is a USB interface, and the connector 1 can be docked with an output end of an external power supply conforming to the USB specification. Since the external power supply conforming to the USB specification is relatively common, the connector 1 of the charging adapter device can be conveniently connected to various external power supplies conforming to the USB specification. In addition, through the adapter plate 4 and the pins 2 of the charging adapter device, the electric power received by the connector 1 can be conveniently input into a battery module through the adapter plate 4 and the pins 2, and the charging adapter device can be simply arranged in a housing of the electronic product and extend to the interior of the electronic product.

In order to further improve the convenience of using the charging adapter device, in some embodiments, the connector 1 is a type-C interface conforming to a USB type-C specification. The type-C interface has a thinner thickness, so that a volume of the charging adapter device can be reduced. Of course, those skilled in the art can set the form of the connector 1 as required, and the form of the connector 1 is not limited herein.

In some embodiments, the adapter plate 4 includes a flexible printed circuit (FPC) by which the electrical connection between the connector 1 and the pins 2 is achieved. In this embodiment, the adapter plate 4 includes a printed circuit board (PCB) through which the connection between the connector 1 and the pins 2 can be facilitated. Of course, those skilled in the art can set the form of the adapter plate 4 as required, and the form of the adapter plate 4 is not limited herein.

In order to further improve the convenience of connection between the pins 2 and the adapter plate 4, as shown in FIG. 3, the pins 2 are perpendicularly inserted into the adapter plate 4. In some embodiments, the adapter plate 4 is provided with first sockets matched with the two pins 2, respectively, and each pin 2 is inserted into one first socket. In some embodiments, the pins 2 are welded in the first sockets, respectively, so that the pins 2 are reliably connected to the adapter plate 4.

Figure 6:
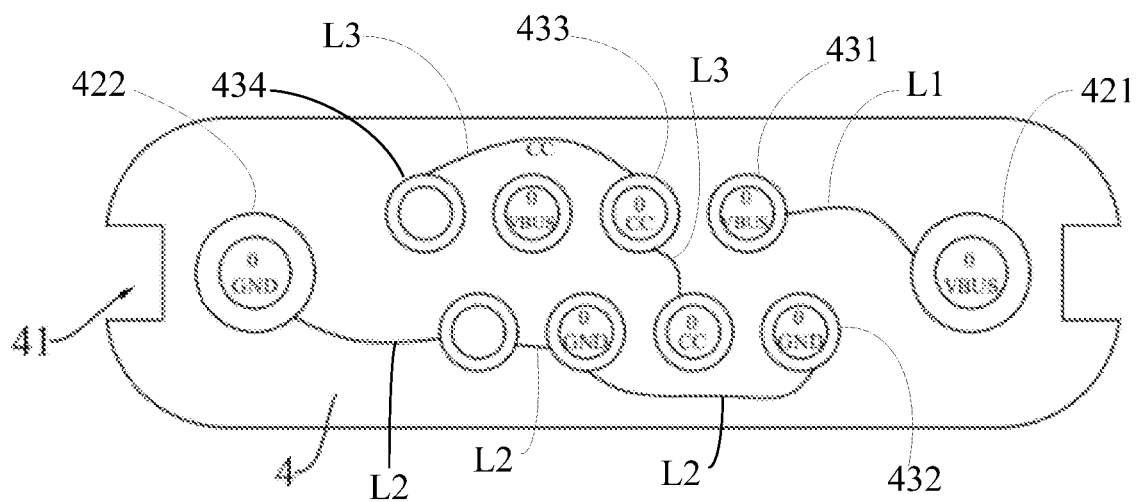
FIG. 6 is a front view of an adapter plate according to an embodiment of the present disclosure.
Figure 8:
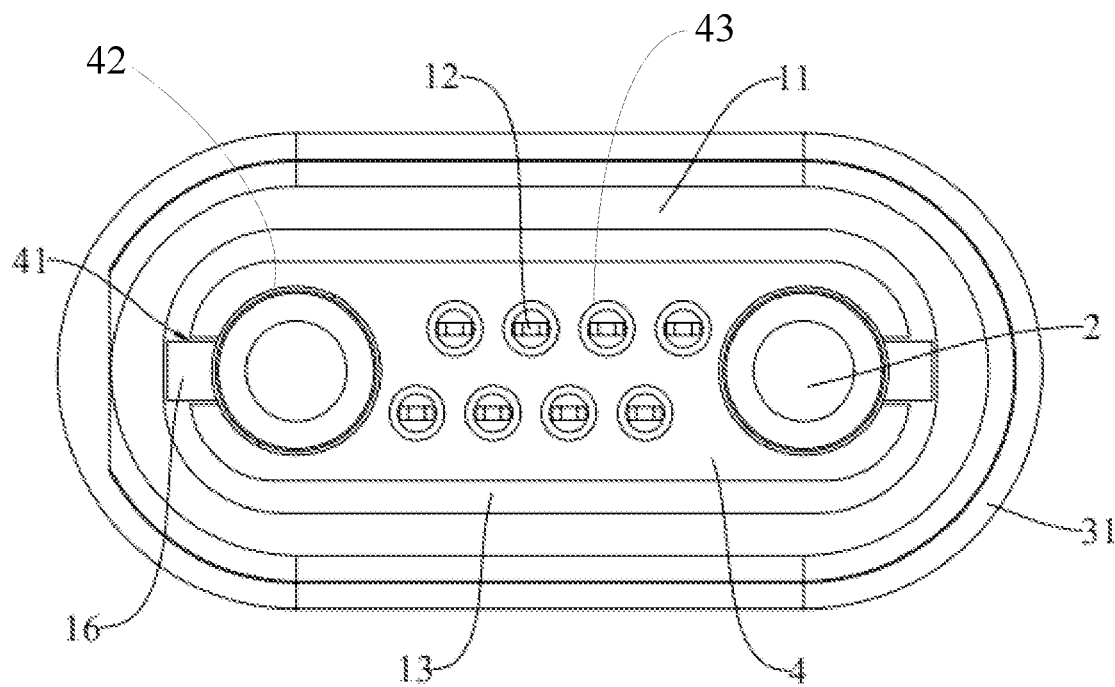
FIG. 8 is a rear view of a charging adapter device according to an embodiment of the present disclosure, where a glue is omitted.

In some embodiments, as shown in FIG. 3, terminals 12 of the connector 1 are perpendicularly inserted in the adapter plate 4, thereby facilitating the connection between the terminal 12 of the connector 1 and the adapter plate 4. In some embodiments, the adapter plate 4 is provided with second sockets which match the terminals 12 on the connector 1 in one-to-one correspondence, and each terminal 12 of the connector 1 is inserted into a respective one of the second sockets. In this way, the connector 1 is reliably connected to the adapter plate 4, and the assembly efficiency can be improved. In the present application, the number of pins 2 is different from the number of terminals 12, and the adapter plate 4 electrically converts the terminals 12 of the connector 1 into the pins 2. In some embodiments, as shown in FIG. 3, FIG. 6 and FIG. 8, the number of terminals 12 is 8 as an example, and the eight terminals 12 can be converted into the two pins 2 by the adapter plate 4. In practice the number of terminals 12 can be adjusted as needed. In some embodiments, the number of terminals 12 is greater than the number of pins 2.

In some embodiments, the adapter plate 4 is perpendicularly disposed between the pins 2 and the terminals 12 of the connector 1. The term "perpendicularly" described herein refers to that an extension direction of the pins 2 and an extension direction of the terminals 12 of the connector 1 are perpendicular to two opposite main surfaces of the adapter plate 4. The two pins 2 are perpendicularly inserted onto one of the two main surfaces of the adapter plate 4 and fixed on the one of the two main surfaces of the adapter plate 4. The terminals 12 are perpendicularly inserted onto another of the two main surfaces of the adapter plate 4 and fixed on the another of the two main surfaces of the adapter plate 4. In this way, the adapter plate 4 is tightly sandwiched between the two pins 2 and the connector 1, so that the whole charging adapter device is more compact, thereby reducing the space occupied in the electronic product.

In some embodiments, the connector 1 further includes a body 13 and a tongue plate 14 extending from the body 13 in a direction facing away from the adapter plate 4. The body 13 is located between the tongue plate 14 and the adapter plate 4. One end of the terminal 12 extends to the tongue plate 14 in the extension direction of the terminal 12 and another end of the terminal 12 extends to the adapter plate 4 in the extension direction of the terminal 12. The body 13 is located in the housing 11, and an inner wall of the housing 11 encircles the body 13 and is in contact with the body 13. The housing 11 and the body 13 define a first accommodation space 61, and the tongue plate 14 is located in the first accommodation space 61. In some embodiments, as shown in FIG. 3, the connector 1 further includes contacts 17 disposed on two opposite sides of the tongue plate 14. In some embodiments, the number of the contacts 17 is different from the number of terminals 12. In some embodiments, the number of the contacts 17 is greater than the number of terminals 12. In some embodiments, the number of the contacts 17 is greater than the number of the pins 2. It is to be noted that not all of the contacts 17 extend through the body 13 to form the terminals 12, but only a part of the contacts 17 extend through the body 13 to form the terminals 12. In some embodiments, as shown in FIG. 3, the connector 1 is a type-C interface, and thus the number of the contacts 17 is 24. In some embodiment, the number of the contacts 17 is greater than the number of the terminals 12, and the number of the terminals 12 is greater than the number of the pins 2.

Figure 7:
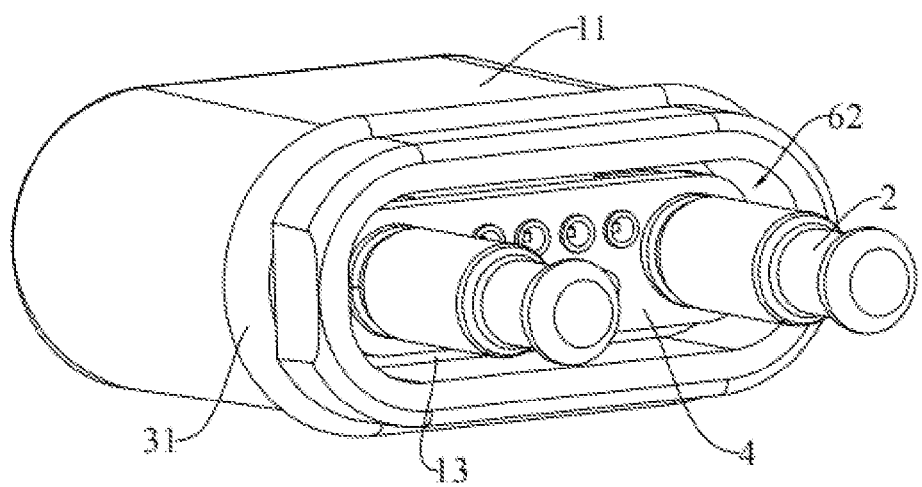
FIG. 7 is a perspective schematic view of a charging adapter device from a third perspective according to an embodiment of the present disclosure, where a glue is omitted.

As shown in FIG. 2, FIG. 7, and FIG. 8, in some embodiments, the housing 11 and the body 13 define a second accommodation space 62, the first accommodation space 61 and the second accommodation space 62 are located on two opposite sides of the body 13, and the adapter plate 4 is located in the second accommodation space 62. In some embodiments, a gap exists between the adapter plate 4 and the inner wall of the housing 11, and the adapter plate 4 is not in contact with the inner wall of the housing 11.

In some embodiments, the body 13 is plate-shaped and perpendicular to the extension direction of the terminal 12, and the extension direction of the pins 2 and the extension direction of the terminals 12 are perpendicular to the two opposite main surfaces of the body 13. In some embodiments, the adapter plate 4 and the body 13 are parallel to each other and perpendicular to the extension direction of the pins 2 and the extension direction of the terminals 12. In some embodiments, an outer peripheral wall of the adapter plate 4 is recessed inward with respect to an outer peripheral wall of the body 13 in a direction facing away from the inner wall of the housing 11.

In some embodiments, the connector 1 further includes a spacer member 15, and the spacer member 15 is arranged on one surface of the body 13 facing towards the adapter plate 4, and is sandwiched between the body 13 and the adapter plate 4. When the terminals 12 are inserted into the adapter plate 4, the spacer member 15 prevents the body 13 from contacting the adapter plate 4, but keeps a gap between the body 13 and the adapter plate 4, and a portion of the terminals 12 is located in the gap between the adapter plate 4 and the body 13.

In some embodiments, the connector 1 further includes two positioning pieces 16, the two positioning pieces 16 are arranged on the one surface of the body 13 facing towards the adapter plate 4, and the two positioning pieces 16 are arranged on two opposite sides of the body 13, respectively. The adapter plate 4 further includes two positioning openings 41 which are arranged on two opposite sides of the adapter plate 4, respectively, and the two positioning pieces 16 extend into the two positioning openings 41, respectively. The positioning pieces 16 and the positioning openings 41 cooperate with each other such that the adapter plate 4 and the body 13 can be positioned with respect to each other, thereby facilitating the assembly operation. In some embodiments, the positioning pieces 16 and the positioning openings 41 are provided with structures engaging with each other, such as tenons and grooves, so that the body 13 can be engaged with the adapter plate 4 through the positioning pieces 16 and the positioning openings 41.

Figure 5:
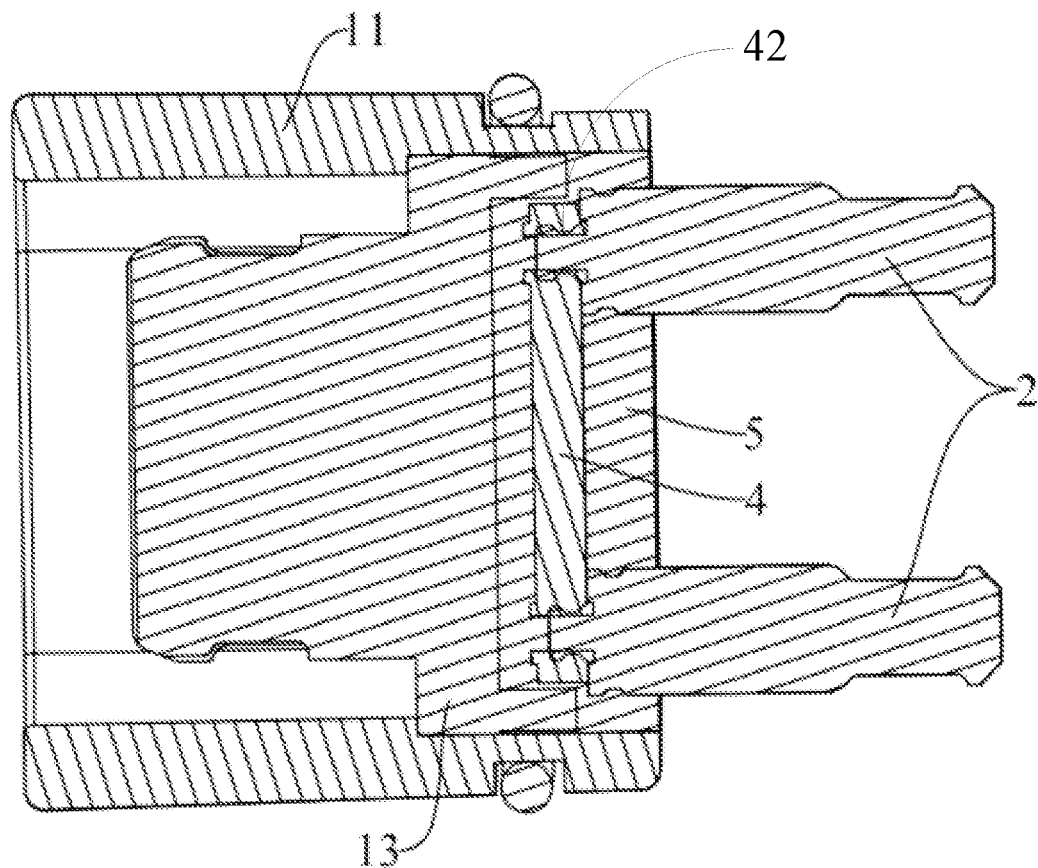
FIG. 5 is a cross-sectional view of FIG. 4 taken along a line A-A'.

In some embodiments, as shown in FIG. 5 and FIG. 6, VBUS is a power supply port, GND is a ground port, and CC is a USBPD communication line port. One of the two pins 2 is a grounding end and another of the two pins 2 is a power supply end. A grounding terminal of the connector 1 is connected to the one of the two pins 2, which is the grounding end, through the adapter plate 4, and a power supply terminal of the connector 1 is connected to the another of the two pins 2, which is the power supply end, through the adapter plate 4. In this way, the connector 1 can be connected to an external power supply (such as a charger, a computer, and the like) and, a battery inside the electronic product can be charged through the pins 2. As shown in FIG. 5, FIG. 6, and FIG. 8, the adapter plate 4 further includes first conductive ports 42 and second conductive ports 43. The first conductive ports 42 are respectively connected to the pins 2, and the second conductive ports 43 are respectively connected to the terminals 12. In some embodiments, a part of the second conductive ports 43 are respectively connected to the first conductive ports 42. In some embodiments, at least two of the second conductive ports 43 are connected to a same one of the first conductive ports 42. The number of the second conductive ports 43 is greater than the number of the first conductive ports 42. At least one of the second conductive ports 43 is connected to one of the first conductive ports 42 through a first circuit L1 formed on the adapter plate 4, and at least another one of the second conductive ports 43 is connected to another one of the first conductive ports 42 through a second circuit L2 formed on the adapter plater 4. In some embodiments, the first conductive ports 42 includes a first power supply (VBUS) port 421 and a first ground (GND) port 422, and the second conductive ports 43 includes second VBUS ports 431 and second GND ports 432. The first VBUS port 421 is connected to at least one of the second VBUS ports 431 through the first circuit L1, and the first GND port 422 is connected to at least one of the second GND ports 432 through the second circuit L2. In some embodiments, the number of the first VBUS port 421 is one, and the number of the first GND port 422 is one. The number of the second VBUS ports 431 is two, and the number of the second GND ports 432 is two. One of the second VBUS ports 431 is connected to the first VBUS port 421 through the first circuit L1. The two second GND ports 432 are connected to the first GND port 422 through the second circuit L2. In some embodiments, the second conductive ports 43 further include CC ports 433, the CC ports 433 are connected to each other through a third circuit L3 formed on the adapter plate 4. In some embodiments, the second conductive ports 43 further include reserved ports 434. One of the CC ports 433 is connected to one of the reserved ports. The second GND ports 432 and another one of the reserved ports are connected to the first GND port 422 through the second circuit L2. In some embodiments, the second conductive ports 43 are arranged in two rows. The second VBUS ports 431 are arranged in one of the two rows, and the second GND ports 432 are arranged in the other one of the two rows. In some embodiments, the number of the first conductive ports 42 is two, and the number of the second conductive ports 43 is eight.

As shown in FIG. 1 and FIG. 2, the outer wall of the housing 11 is provided with a sealing structure 3 so that the housing 11 can be sealingly connected to the product. The sealing structure 3 is provided such that when the charging adapter device in this embodiment is connected to the product, the housing 11 can be sealingly connected to an inner wall of a connecting hole of the product, thereby preventing water from entering the product through the joint of the housing 11 and the inner wall of the connecting hole, and further improving the waterproof performance. In this way, the charging adapter device in this embodiment can be applied to the occasion where waterproofing is required, such as an electric razor, so that the application range of the charging adapter device in this embodiment is improved. For example, a housing of the electric razor has a connecting hole, the housing 11 of the charging adapter device is fixed in the connecting hole, and the sealing structure 3 can fill a gap between the housing 11 and the inner wall of the connecting hole.

In some embodiments, the outer wall of the housing 11 is circumferentially provided with a groove 7, and the sealing structure 3 is arranged in the groove 7. In some embodiments, the sealing structure 3 includes a sealing ring 31, and the sealing ring 31 is sleeved in the groove 7 so that the sealing structure 3 has a simple structure and a good sealing effect. Of course, those skilled in the art can set the form of the sealing structure 3 as required, and the form of the sealing structure 3 is not limited herein.

In order to further improve the sealing performance of the charging adapter device in this embodiment, the outer wall of the adapter plate 4 is sealingly connected to the inner wall of the housing 11, so that water can be prevented from entering the product from the joint of the connector 1. Through the sealing structures of the charging adapter device itself and the sealing structures of the charging adapter device with the product, the safety of the product is further improved when the product is used and the application range of the charging adapter device in this embodiment is expanded.

In some embodiments, as shown in FIG. 4, FIG. 5, FIG. 7, and FIG. 8, the charging adapter device further includes a glue 5. The glue 5 is located in the housing 11. The glue 5 is connected to the housing 11, the body 13 and the adapter plate 4, and the glue 5 covers a part of the terminals 12 and a part of the pins 2. In some embodiments, the glue 5 is located in the second accommodation space 62. In some embodiments, as shown in FIG. 1, the glue 5 fills the second accommodation space 62. In some embodiments, a part of the glue 5 fills the gap between the body 13 and the adapter plate 4, and the glue 5 covers the adapter plate 4. In some embodiments, the adapter plate 4 is sealingly connected to the inner wall of the housing 11 through the glue 5, where the glue 5 is formed by dispensing glue or injecting and curing liquid glue. For example, the liquid glue is dispensed into the interior of the housing 11 from the opening of the housing 11, a range of dispensing is defined by the adapter plate 4, the housing 11, and the body 13, and the liquid glue is cured and formed after the liquid glue is filled within the range of dispensing. For example, the liquid glue enters the second accommodation space 62 from the opening of the second accommodation space 62, and fills the gaps among the housing 11, the body 13 and the adapter plate 4, thereby improving the sealing performance of the interior of the charging adapter device. In some embodiments, since the outer peripheral wall of the adapter plate 4 is recessed inward with respect to the outer peripheral wall of the body 13 in the direction facing away from the inner wall of the housing 11, the glue 5 encircles the outer peripheral wall of the adapter plate 4, and fills the gap between the outer peripheral wall of the adapter plate 4 and the inner wall of the housing 11.

In the charging adapter device of this embodiment, the connector 1 is connected to the pins 2 through the adapter plate 4. When the pins 2 are connected to the product, the product can be charged through the connector 1, so that the connector can be used in common with chargers of other electronic products to achieve the convenience of charging the product. The adapter assembly is sealingly connected to the housing 11, and the housing 11 is sealingly connected to the product, such that the waterproof performance is improved, thereby facilitating expanding the application range of the charging adapter device in this embodiment.

An embodiment further provides an installing method of a charging adapter device, the installing method is applied to the above-mentioned charging adapter device, and the installing method of the charging adapter device includes steps described below. The two pins 2 and the terminals 12 of the connector 1 are respectively connected to the adapter plate 4 to form an adapter assembly. The adapter assembly is installed in the housing 11 and sealingly connected to the housing 11. In the installing method of this embodiment, components in the housing 11 are assembled together in advance to form the adapter assembly, and then the adapter assembly is connected to the housing 11, so that the operation is simple and the sealing performance is good, thereby facilitating safety of product usage.

In some embodiments, the adapter plate 4 is installed in the housing 11 in a dispensing-glue mode. In some embodiments, liquid glue is dispensed or injected into the housing 11 from the opening of the housing 11 so as to enable the liquid glue to connect the inner wall of the housing 11, the body 13 and the adapter plate 4, and to cover a part of the terminals 12 and a part of the pins 2. The liquid glue fills the connection portion between the adapter plate 4 and the inner wall of the housing 11, and after the glue fills the connection portion between the adapter plate 4 and the inner wall of the housing 11, the liquid glue is baked and cured to form the glue 5, so that the charging adapter device in this embodiment has a better waterproof effect.

In some embodiments, the charging adapter device includes a sealing structure 3 arranged on the outer wall of the housing 11. Before the adapter assembly is installed in the housing 11, the sealing structure 3 is connected to the outer wall of the housing 11, such that the installation of the sealing structure 3 with the housing 11 and the installation of the adapter plate 4 with the two pins 2 and the terminals 12 of the connector 1 can be carried out simultaneously, thus improving the installation efficiency of the charging adapter device in this embodiment.

In the installing method of the charging adapter device of the present disclosure, components in the housing are assembled together in advance to form the adapter assembly, and then the adapter assembly is connected to the housing, so that the operation is simple and the installation efficiency of the above-mentioned charging adapter device can be improved.

The principle of the present disclosure is described above in conjunction with the embodiments. The description is merely used for explaining the principle of the present disclosure, and is not intended to explain as limitations to the protection scope of present disclosure in any means. Based on the explanations herein, other embodiments of the present disclosure obtained by those skilled in the art are within the scope of the present disclosure on the premise that no creative work is done.

What is claimed is:

1. A charging adapter device, comprising:
    a connector, wherein the connector comprises a housing and a plurality of terminals;
    an adapter plate arranged in the housing, wherein the adapter plate is electrically connected to the terminals; and
    a plurality of pins, wherein the pins are electrically connected to the adapter plate such that the pins are electrically conductive with the connector through the adapter plate;
    wherein, a number of the pins differs from a number of the terminals, and the adapter plate electrically converts the terminals of the connector into the pins;
    wherein the adapter plate comprises a plurality of first conductive ports and a plurality of second conductive ports, the first conductive ports are respectively connected to the pins, the second conductive ports are respectively connected to the terminals; a number of the second conductive ports is greater than a number of the first conductive ports; at least one of the second conductive ports is connected to one of the first conductive ports through a first circuit formed on the adapter plate, and at least another one of the second conductive ports is connected to another one of the first conductive ports through a second circuit formed on the adapter plate;
    wherein the first conductive ports comprise a first power supply port and a first ground port, the second conductive ports comprise a plurality of second power supply ports and a plurality of second ground ports, the first power supply port is connected to at least one of the second power supply ports through the first circuit, and the first ground port is connected to at least one of the second ground ports through the second circuit.

2. The charging adapter device of claim 1, wherein the adapter plate further comprises a flexible printed circuit (FPC) or a printed circuit board (PCB).

3. The charging adapter device of claim 1, wherein the number of the terminals is greater than the number of the pins.

4. The charging adapter device of claim 1, wherein the number of the pins is two, the number of the terminals is eight and the eight terminals are converted into the two pins by the adapter plate.

5. The charging adapter device of claim 1, wherein the connector further comprises a body, a tongue plate, and a plurality of contacts, the tongue plate extends from the body in a direction facing away from the adapter plate, the body is located between the tongue plate and the adapter plate, the contacts are on two opposite sides of the tongue plate, and a number of the contacts is greater than the number of the pins.

6. The charging adapter device of claim 5, wherein the body is located in the housing, the housing is in encircling contact with the body, the housing and the body form a first accommodation space and a second accommodation space, the first accommodation space and the second accommodation space are located on two opposite sides of the body, respectively, the tongue plate is located in the first accommodation space, and the adapter plate is located in the second accommodation space.

7. The charging adapter device of claim 5, wherein the connector further comprises two positioning pieces, the two positioning pieces are arranged on one surface of the body facing towards the adapter plate and are arranged on two opposite sides of the body, respectively, the adapter plate further comprises two positioning openings arranged on two opposite sides of the adapter plate, respectively, and the two positioning pieces extend into the two positioning openings, respectively.

8. The charging adapter device of claim 5, wherein the number of the contacts is greater than the number of the terminals, the number of the terminals is greater than the number of the pins, and a part of the contacts extend through the body to form the terminals.

9. The charging adapter device of claim 1, wherein a number of the second power supply ports is two, a number of the second ground ports is two, one of the second power supply ports is connected to the first power supply port through the first circuit, and the two second ground ports are connected to the first ground port through the second circuit.

10. The charging adapter device of claim 1, wherein a part of the second conductive ports are respectively connected to the first conductive ports, and at least two of the second conductive ports are connected to a same one of the first conductive ports.

11. The charging adapter device of claim 1, wherein an outer wall of the housing is provided with a sealing structure, the outer wall of the housing is circumferentially provided with a groove, and the sealing structure is sleeved in the groove.

12. A charging adapter device, comprising:
    a connector, wherein the connector comprises a housing and a plurality of terminals;
    an adapter plate arranged in the housing, wherein the adapter plate is electrically connected to the terminals;
    a plurality of pins, wherein the pins are electrically connected to the adapter plate such that the pins are electrically conductive with the connector through the adapter plate;
    wherein, a number of the pins differs from a number of the terminals, and the adapter plate electrically converts the terminals of the connector into the pins;
    wherein the connector further comprises a body, a tongue plate, and a plurality of contacts, the tongue plate extends from the body in a direction facing away from the adapter plate, the body is located between the tongue plate and the adapter plate, the contacts are on two opposite sides of the tongue plate, and a number of the contacts is greater than the number of the pins;
    wherein the body is located in the housing, the housing is in encircling contact with the body, the housing and the body form a first accommodation space and a second accommodation space, the first accommodation space and the second accommodation space are located on two opposite sides of the body, respectively, the tongue plate is located in the first accommodation space, and the adapter plate is located in the second accommodation space; and wherein the charging adapter device further comprises a glue, wherein the glue is located in the second accommodation space, and the glue is connected to the housing, the body and the adapter plate, and the glue covers a part of the terminals and a part of the pins.

13. The charging adapter device of claim 12, wherein the connector further comprises a spacer member, the spacer member is arranged on one surface of the body facing towards the adapter plate and is sandwiched between the body and the adapter plate, and the glue fills a gap between the body and the adapter plate and covers the adapter plate.

14. The charging adapter device of claim 12, wherein an outer peripheral wall of the adapter plate is recessed inward with respect to an outer peripheral wall of the body in a direction facing away from the housing, and the glue surrounds the outer peripheral wall of the adapter plate and fills a gap between the outer peripheral wall of the adapter plate and an inner wall of the housing.

15. An installing method of a charging adapter device, applied to a charging adapter device, wherein the charging adapter device comprises a connector, an adapter plate and pins, the connector comprises a housing and terminals; the adapter plate arranged in the housing, the adapter plate is electrically connected to the terminals; and the pins are electrically connected to the adapter plate such that the pins are electrically conductive with the connector through the adapter plate, wherein, a number of the pins differs from a number of the terminals, and the adapter plate electrically converts the terminals of the connector into the pins, and the installing method of the charging adapter device comprising:

connecting the pins and the terminals to the adapter plate to form an adapter assembly; and installing the adapter assembly in the housing, and sealingly connecting the adapter assembly to the housing;

wherein the adapter plate comprises a plurality of first conductive ports and a plurality of second conductive ports, the first conductive ports are respectively connected to the pins, the second conductive ports are respectively connected to the terminals; a number of the second conductive ports is greater than a number of the first conductive ports; at least one of the second conductive ports is connected to one of the first conductive ports through a first circuit formed on the adapter plate, and at least another one of the second conductive ports is connected to another one of the first conductive ports through a second circuit formed on the adapter plate;

wherein the first conductive ports comprise a first power supply port and a first ground port, the second conductive ports comprise a plurality of second power supply ports and a plurality of second ground ports, the first power supply port is connected to at least one of the second power supply ports through the first circuit, and the first ground port is connected to at least one of the second ground ports through the second circuit.

16. The installing method of the charging adapter device of claim 15, wherein the number of the terminals is greater than the number of the pins.

* * * * *